United States Patent Office 3,462,433
Patented Aug. 19, 1969

---

3,462,433
DERIVATIVES OF 2-(2'-HALO-ANILINO)1,3-DIAZACYCLO-PENTENE-(2)
Helmut Stahle, Herbert Koppe, Karl Zeile, and Martin Wolf, Ingelheim am Rhein, and Wolfgang Hoefke, Budenheim (Rhine), Germany, assignors to Boehringer Ingelheim G.m.b.H., Ingelheim am Rhein, Germany, a corporation of Germany
No Drawing. Filed Sept. 30, 1966, Ser. No. 583,421
Claims priority, application Germany, Oct. 1, 1965, B 83,965
Int. Cl. C07d *49/30;* A61k *25/00*
U.S. Cl. 260—253         8 Claims

ABSTRACT OF THE DISCLOSURE

The compounds are 2-(2'-halo-anilino)-1,3-diazacyclopentenes-(2) and acid addition salts thereof, useful as hypotensives and sedatives in warm-blooded animals.

---

The present invention relates to novel derivatives of 2-(2'-halo - anilino)-1,3-diazacyclopentene - (2) and salts thereof, as well as to various methods of preparing these compounds.

More particularly, the present invention relates to a novel class of 2-(2'-halo-anilino)-1,3-diazacyclopentenes-(2) of the formula

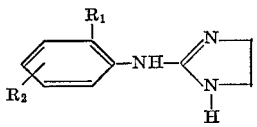

wherein:

$R_1$ is chlorine or bromine, and
$R_2$ is bromine, trifluoromethyl or cyano, each in 3-, 4- or 5-position, or chlorine in 3- or 5-position of the phenyl ring, provided, however, that $R_1$ and $R_2$ are not both chlorine at the same time, as well as to salts of this class of compounds, especially to non-toxic, pharmacologically acceptable acid addition salts thereof.

The compounds according to the present invention may be prepared by any of the known methods for the preparation of 2-arylamino-1,3-diazacyclopentenes, such as those described in U.S. Patents 2,899,426, 3,202,660 and 3,236,857. However, the following methods have proved to be particularly convenient and efficient:

METHOD A

By reacting an isothiouronium salt of the formula

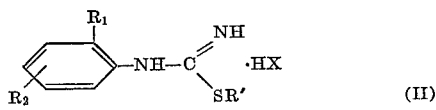

wherein $R_1$ and $R_2$ have the same meanings as in Formula I, R' is lower alkyl, and X is the anion of an acid, preferably the anion of a hydrohalic acid, with ethylenediamine.

The reaction may be carried out with or without an inert solvent. Thus, the reaction may be effected by simply heating a mixture of the reactants to between 100 and 200° C., whereby satisfactory yields of the desired end product are obtained. Alternatively, the reaction may also be carried out at relatively low temperatures (60–140° C.) in the presence of a suitable inert solvent, preferably one which contains polar groups, such as water or a lower alkanol; however, under these conditions longer reaction periods must be accepted if good yields are to be achieved.

The isothiouronium salt of the Formula II may itself be prepared by customary methods, such as by heating a thiourea derivative of the Formula III below, obtained from a correspondingly substituted aniline and ammonium thiocyanate (Houben-Weyl, vol. 9, p. 887), with an alkylating agent, such as a lower alkyl halide or a di-lower alkylsulfate.

METHOD B

By reacting an N-phenyl-thiourea compound of the formula

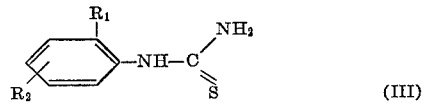

wherein $R_1$ and $R_2$ have the same meanings as in Formula I, with ethylenediamine. The reaction is advantageously performed by heating a mixture of the reactants, preferably in a vacuum, using a stoichiometric excess of ethylenediamine.

The N-phenyl-thiourea compound of the Formula III may be obtained from a correspondingly substituted aniline and ammonium thiocyanate, as indicated above.

METHOD C

By subjecting an N-phenyl-N'-(β-amino-ethyl) - urea compound or -thiourea compound of the formula

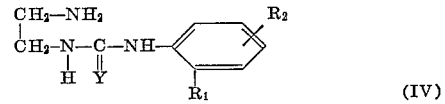

wherein $R_1$ and $R_2$ have the same meanings as in Formula I and Y is oxygen or sulfur, to pyrolysis to effect ring closure of the diazacyclopentene ring.

A starting compound of the Formula IV may itself be obtained by reacting a correspondingly substituted phenylisocyanate or phenyl-isothiocyanate with ethylenediamine, pursuant to the method described in Journal of Organic Chemistry, vol. 24, page 818 (1959).

The end products obtained by methods A through C, that is, the compounds embraced by Formula I, are organic bases and form non-toxic salts, especially non-toxic, pharmacologically acceptable acid addition salts, with various inorganic or organic acids and synthetic acid resins. Examples of non-toxic, pharmacologically acceptable acid addition salts include, but are not limited to, those formed with hydrochloric acid, hydrobromic acid, phosphoric acid, sulfuric acid, nitric acid, oxalic acid, 8-chlorotheophylline or the like. An example of a non-toxic salt with an acid synthetic resin is that formed with a cross-linked polystyrene polymer containing sulfonic acid groups, such as "Zeo-Karb 225" (manufactured by The Permutit Co., New York).

The following examples further illustrate the present invention and will enable others skilled in the art to understand it more completely. It should be understood, however, that the invention is not limited to the particular examples given below.

EXAMPLE 1

Preparation of 2-(2'-chloro-5'-trifluoromethyl-anilino)-1, 3-diazacyclopentene-(2) by method A A mixture of 15.8 gm. (0.04 mol) of N-(2-chloro-5-trifluoromethyl-phenyl)-isothiouronium hydroiodide, 4 cc. of ethylenediamine (150% of the stoichiometrically required amount) and 50 cc. of methanol was refluxed for 24 hours. Thereafter, the methanol and the excess unreacted ethylenediamine were distilled off in vacuo, the residue was taken up in 20 cc. of methanol, and the resulting solution was made alkaline with 30 cc. of aqueous 30% potassium hydroxide. The initially oily precipitate formed thereby became crystalline after cooling the reaction mixture with ice; it was isolated by vacuum filtration, washed with water and dried. 5 gm. (47.6% of theory) of 2-(2'-chloro-5'-trifluoromethyl-anilino)-1,3-diazacyclopentene-(2), M.P. 121–123° C., of the formula

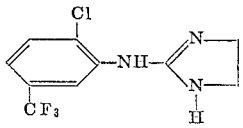

were obtained.

Its nitrate, obtained by dissolving the free base in ether and adding concentrated nitric acid to the solution until it reacted acid to Congo red, had a melting point of 152–153° C., was difficultly soluble in cold water, freely soluble in warm water and thin-film-chromatographically pure.

EXAMPLE 2

Using a procedure analogous to that described in Example 1, 2 - (2' - chloro - 4' - trifluoromethyl-anilino)-1,3-diazacyclopentene-(2), M.P. 112° C., was prepared from N-(2-chloro-4-trifluoromethyl-phenyl)-isothiouronium hydroiodide and ethylenediamine. The yield was 15.4% of theory.

Its nitrate had a melting point of 138–140° C.

EXAMPLE 3

Preparation of 2-(2'-chloro-4'-bromo-anilino)-1,3-diazacyclopentene-(2) by method A A mixture of 24.3 gm. (0.1 mol) of 2-chloro-4-bromo-aniline hydrochloride, 8 gm. (0.105 mol) of ammonium thiocyanate and 130 cc. of chlorobenzene was heated for about 10 hours at 95–100° C. Thereafter, the reaction mixture was cooled, the precipitate formed thereby was collected by vacuum filtration, washed with water and petroleum ether, digested with 200 cc. of water, 200 cc. of petroleum ether were added, the mixture was made alkaline with sodium carbonate, and the precipitate was separated by vacuum filtration. 26.54 gm. (0.1 mol) of N-(2-chloro-4-bromo-phenyl)-isothiourea were obtained, which were admixed with 100 cc. of methanol and 21.3 gm. (0.15 mol) of methyliodide, and the mixture was boiled for 1.5 hours. Thereafter, the reaction mixture was evaporated in vacuo, and the residue was dried. 40.7 gm. (0.1 mol) of N - (2 - chloro - 4 - bromo - phenyl) - iso-thiouronium hydroiodide were obtained. This product was admixed with 70 cc. of methanol and 9 gm. (0.15 mol) of ethylenediamine, and the mixture was refluxed for 16 hours. Thereafter, the methanol was distilled off in vacuo, the residue was dissolved in a small amount of methanol, and the solution was made alkaline with aqueous 50% potassium hydroxide, cooled and then vigorously stirred with petroleum ether. The insoluble matter was separated by vacuum filtration, washed with water, dried and recrystallized from benzene/petroleum ether, yielding 2-(2' - chloro - 4' - bromo - anilino) - 1,3 - diazacyclopentene-(2), M.P. 142–145° C. of the formula

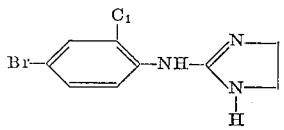

This free base product was dissolved in ether, the solution was acidified with ethereal hydrochloric acid, and the precipitate formed thereby was recrystallized from methanol/ether, yielding thin-film-chromatographically pure 2 - (2' - chloro - 4' - bromo - anilino) - 1,3-diazacyclopentene-(2) hydrochloride, M.P. 203–205° C.

EXAMPLE 4

Using a procedure analogous to that described in Example 3, 2-(2',4'-dibromo-anilino)-1,3-diazacyclopentene-(2), M.P. 135–140° C., of the formula

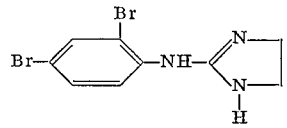

was prepared from N-(2,4-dibromo-phenyl)-isothiouronium hydroiodide and ethylenediamine.

Its thin-film-chromatographically pure nitrate had a melting point of 160–161° C.

EXAMPLE 5

Using a procedure analogous to that described in Example 4, 2-(2'-bromo-5'-chloro-anilino)-1,3-diazacyclopentene-(2), M.P. 172–173° C., of the formula

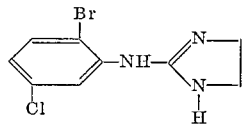

was prepared from N-(2-bromo-5-chloro-phenyl)-isothiouronium hydroiodide and ethylene diamine.

Its thin-film-chromatographically pure hydrochloride had a melting point of 255–256° C.

EXAMPLE 6

Preparation of 2-(2'-chloro-5'-bromo-anilino)-1,3-diazacyclopentene-(2) by method A 129 gm. (0.75 mol) of 4-chloro-aniline were subjected to the Sandmeyer Reaction with CuBr, yielding 165 gm. (93.5% of theory) of 2-chloro-5-bromo-nitrobenzene. The product was hydrogenated under normal conditions of temperature and pressure in the presence of Raney nickel as a catalyst until the calculated amount of hydrogen had been absorbed, yielding 90% of theory of 2-chloro-5-bromo-aniline, whose hydrochloride had a melting point of 190–193° C.

24.3 gm. (0.1 mol) of 2-chloro-5-bromo-aniline hydrochloride were admixed with 8 gm. (0.105 mol) of ammonium thiocyanate and 130 cc. of chlorobenzene, and the mixture was heated at 95–100° C. for about 8 hours. Thereafter, the reaction mixture was cooled, and the precipitate was collected by vacuum filtration, washed with water and petroleum ether, digested with 200 cc. of water, 200 cc. of petroleum ether were added, the solution was made alkaline with sodium carbonate, and the precipitate formed thereby was collected by vacuum filtration. 41.4% of theory of N - (2-chloro-5-bromo-phenyl)-isothiourea, M.P. 131–133° C., were obtained.

11 gm. (0.041 mol) of N-(2-chloro-5-bromo-phenyl)-isothiourea were admixed with 40 cc. of methanol and 3.8 cc. of methyliodide, and the mixture was boiled for 1.5 hours. Thereafter, the reaction solution was evaporated, and the residue was dried. The N-(2-chloro-5-bromo-phenyl)-isothiouronium hydroiodide thus obtained was admixed with 40 cc. of methanol and 4.1 cc. of ethylenediamine (150% of the stoichiometrically required amount), and the mixture was refluxed for 17 hours. Thereafter, the methanol and the unreacted excess ethylenediamine were distilled off in vacuo, the residue was dissolved in a small amount of methanol, and the solution was made alkaline with aqueous 50% potassium hydroxide, cooled and then vigorously stirred with petroleum ether. The precipitate was collected by vacuum filtration, washed with water and dried. 6.0 gm. (53.0% of theory) of 2-(2'-chloro- 5′-bromo-anilino)-1,3-diazacyclopentene-(2), M.P. 157–160° C., of the formula

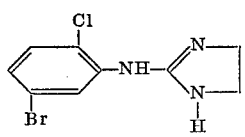

were obtained.

Its thin-film-chromatographically pure hydrochloride had a melting point of 251–253° C.

*Analysis (hydrochloride).*—Calculated: C, 34.75%; H, 3.24%; N, 13.51%; Cl, 22.79%; Br, 25.69%. Found: C, 34.58%; H, 3.39%; N, 13.32%; Cl, 22.98%; Br, 25.65%

EXAMPLE 7

Using a procedure analogous to that described in Example 7, 2 - (2′,5′-dibromo-anilino)-1,3-diazacyclopentene-(2), MP. 166–169° C., of the formula

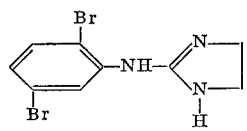

was prepared starting from 2,5-dibromo-aniline hydrochloride through the intermediates N-(2,5-dibromo-phenyl)-isothiourea, M.P. 168–170° C., and N-(2,5-dibromo-phenyl)-S-methyl-isothiouronium hydroiodide. The yield was 57.0% of theory.

Its thin-film-chromatographically pure hydrochloride had a melting point of 286–287° C.

EXAMPLE 8

Preparation of 2-(2′-bromo-5′-trifluoromethyl anilino)-1,3-diazacyclopentene-(2) by method A A mixture of 8.3 gm. (0.028 mol) of N-(2-bromo-5-trifluoromethyl-phenyl)-isothiourea, 2.5 cc. of methyliodide and 30 cc. of methanol was boiled for 2 hours, yielding N - (2-bromo-5-trifluoromethyl-phenyl)-S-methyl-isothiouronium hydroiodide. This product was admixed with 2.8 cc. of ethylenediamine and 30 cc. of methanol, and the mixture was refluxed for 16 hours. Thereafter, the methanol and the excess unreacted ethylenediamine were distilled off in vacuo, the residue was taken up in a small amount of methanol, and the solution was made alkaline with aqueous 50% potassium hydroxide. The initially oily precipitate formed thereby was made to crystallize by cooling the reaction mixture on an ice bath, and was then filtered off, washed with water and dried. 6.0 gm. (69.5% of theory) of 2-(2′-bromo-5′-trifluoromethyl-anilino)-1,3-diazacyclo-pentene-(2), M.P. 144–145° C. after recrystallization from benzene/petroleum ether, of the formula

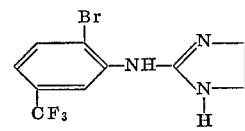

were obtained.

Its nitrate had a melting point of 161–162° C.

EXAMPLE 9

Using a procedure analogous to that described in Example 1, 2-(2′-chloro-3′-bromo-anilino)-1,3-diazacyclopentene-(2) was prepared from N-(2-chloro-3-bromophenyl)-S-methyl-isothiouronium hydroiodide and ethylenediamine.

EXAMPLE 10

Using a procedure analogous to that described in Example 1, 2-(2′-chloro-3′-trifluoromethyl-anilino)-1,3-diazacyclopentene-(2) was prepared from N-(2-chloro-3-trifluoromethyl-phenyl)-S-methyl-isothiouronium hydroiodide and ethylenediamine.

EXAMPLE 11

Using a procedure analogous to that described in Example 1, 2-(2′,3′-dibromo-aniline)-1,3-diazacyclopentene-(2) was prepared from N-(2,3-dibromo-phenyl)-S-methyl-isothiouronium hydroiodide and ethylenediamine.

EXAMPLE 12

Using a procedure analogous to that described in Example 1, 2-(2′-bromo-3-trifluoromethyl-anilino)-1,3-diazacyclopentene-(2) was prepared from N-(2-bromo-3-trifluoromethyl - phenyl) - S-methyl-isothiouronium hydroiodide and ethylenediamine.

EXAMPLE 13

Using a procedure analogous to that described in Example 1, 2-(2′-bromo-4′-trifluoromethyl-anilino)-1,3-diazacyclopentene-(2) was prepared from N-(2-bromo-4-trifluoromethyl - phenyl) - S-methyl-isothiouronium hydroiodide and ethylenediamine.

EXAMPLE 14

Using a procedure analogous to that described in Example 1, 2-(2′-chloro-4′-cyano-anilino)-1,3-diazacyclopentene-(2) was prepared from N-(2-chloro-4-cyano-phenyl)-S - methyl - isothiouronium hydroiodide and ethylenediamine.

The compounds according to the present invention, that is, those embraced by Formula I above and their nontoxic, pharmacologically acceptable acid addition salts, have useful pharmacodynamic properties. More particularly, they exhibit hypotensive and sedative properties in warm-blooded animals.

For pharmaceutical purposes, the compounds of the present invention are administered to warm-blooded animals perorally or parenterally as active ingredients in customary dosage unit compositions, that is, compositions in dosage unit form consisting essentially of an inert carrier and one dosage unit of the active ingredient, such as tablets, coated pills, solutions, suspensions, emulsions, wafers, capsules, suppositories and the like. One dosage unit of a compound according to the present invention is from 0.05 to 30 mgm. A dosage unit composition comprising a compound according to the invention as an active ingredient may, if desired, also contain an effective unit dose of another pharmacodynamically active ingredient, such as a saluretic agent, i.e. a compound which promotes the discharge of salt through the urine.

The following examples illustrate a few dosage unit compositions comprising a compound of the invention as an active ingredient. The parts are parts by weight unless otherwise specified.

EXAMPLE 15

Tablets

The tablet composition is compounded from the following ingredients:

| | Parts |
|---|---|
| 2-(2′-bromo-5′-chloro-anilino)-1,3-diazacyclopentene-(2) | 0.3 |
| Lactose | 53.0 |
| Corn starch | 31.7 |
| Soluble starch | 4.0 |
| Magnesium stearate | 1.0 |
| Total | 90.0 |

The individual ingredients are admixed with each other in a manner customary for manufacture of pharmaceutical tablets, and the mixture is pressed into 90 mgm.-tablets, each of which contains 0.3 mgm. of the diazacyclopentene compound.

EXAMPLE 16

Drop solution

The solution is compounded from the following ingredients:

| | Parts |
|---|---|
| 2-(2'-chloro-4'-fluoro-anilino)-1,3-diazacyclopentene-(2) hydrochloride | 0.02 |
| p-Hydroxy-benzoic acid methyl ester | 0.07 |
| p-Hydroxy-benzoic acid propyl ester | 0.03 |
| Demineralized water, q.s. ad ___by vol__ | 100.00 |

The individual ingredients are dissolved in a sufficient amount of demineralized water, the solution is diluted with additional demineralized water to the desired volume, and the finished solution is filtered. 1 cc. of solution (about 20 drops) contain 0.2 mgm. of the diazacyclopentene compound.

EXAMPLE 17

Hypodermic solution

The solution is compounded from the following ingredients:

| | Parts |
|---|---|
| 2-(2',4'-dibromo-anilino)-1,3-diazacyclopentene-(2) hydrochloride | 0.75 |
| Sodium chloride | 18.00 |
| Distilled water, q.s. ad _____by vol__ | 2000.00 |

The individual ingredients are dissolved in a sufficient amount of distilled water, the solution is diluted with additional distilled water to the desired volume, the dilute solution is filtered until free from suspended particles and then filled into 2 cc.-ampules, which are subsequently sterilized and sealed. Each ampule contains 0.75 mgm. of the diazacyclopentene compound.

EXAMPLE 18

Suppositories

The suppository composition is compounded from the following ingredients:

| | Parts |
|---|---|
| 2-(2'-chloro-4'-bromo-anilino)-1,3-diazacyclopentene-(2) | 7.0 |
| Lactose | 244.2 |
| Cocoa butter, q.s. ad | 1700.0 |

The cocoa butter is melted, the remaining ingredients are stirred into it, the mixture is homogenized, and the finished composition is poured into cooled suppository molds, each holding 1700 mgm. of the composition. Each suppository contains 7.0 mgm. of the diazacyclopentene compound.

Although the above dosage unit composition examples illustrate only four specific compounds according to the present invention as active ingredients, it should be understood that any other compound embraced by formula I or a non-toxic, pharmacologically acceptable acid addition salt thereof may be substituted for the particular diazacyclopentene compound in Examples 15 through 18 above. Moreover, the amount of active ingredients in these examples may be varied within the dosage unit range set forth above, and the amounts and nature of the inert carrier ingredients may be varied to meet particular requirements.

While the present invention has been illustrated with the aid of certain specific embodiments thereof, it will be readily apparent to others skilled in the art that the instant invention is not limited to these particular embodiments, and that various changes and modifications may be made without departing from the spirit of the invention or the scope of the appended claims.

We claim:

1. A compound of a formula selected from the group consisting of

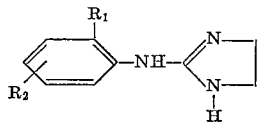

and

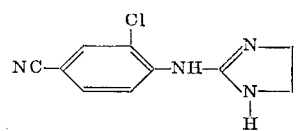

wherein $R_1$ is chlorine or bromine and
$R_2$ is 3-, 4- or 5-trifluoromethyl, or a non-toxic, pharmacologically acceptable acid addition salt thereof.

2. A compound as in claim 1, wherein $R_1$ is chlorine and $R_2$ is 3-trifluoromethyl, or a non-toxic, pharmacologically acceptable acid addition salt thereof.

3. A compound as in claim 1, wherein $R_1$ is chlorine and $R_2$ is 4-trifluoromethyl, or a non-toxic, pharmacologically acceptable acid addition salt thereof.

4. A compound as in claim 1, wherein $R_1$ is chlorine and $R_2$ is 5-trifluoromethyl, or a non-toxic, pharmacologically acceptable acid addition salt thereof.

5. A compound as in claim 1, wherein $R_1$ is bromine and $R_2$ is 3-trifluoromethyl, or a non-toxic, pharmacologically acceptable acid addition salt thereof.

6. A compound as in claim 1, wherein $R_1$ is bromine and $R_2$ is 4-trifluoromethyl, or a non-toxic, pharmacologically acceptable acid addition salt thereof.

7. A compound as in claim 1, wherein $R_1$ is bromine and $R_2$ is 5-trifluoromethyl, or a non-toxic, pharmacologically acceptable acid addition salt thereof.

8. A compound as in claim 1, wherein $R_1$ is chlorine and $R_2$ is 4-cyano, or a non-toxic, pharmacologically acceptable acid addition salt thereof.

References Cited

UNITED STATES PATENTS

| | | | |
|---|---|---|---|
| 2,899,426 | 8/1959 | Bloom | 260—309.6 |
| 3,190,802 | 6/1965 | Zeile et al. | 260—309.6 |

FOREIGN PATENTS

| | | |
|---|---|---|
| 625,631 | 8/1961 | Canada. |
| 1,034,938 | 7/1966 | Great Britain. |

OTHER REFERENCES

Boehringer II Chem. Abst. vol. 63, columns 18102–3 (1965, 12-20-65).

Boehringer III Chem. Abst. vol. 64, column 2096 (1966, 1-17-66).

Netherlands application 6,411,516, April 1965, 260–309.6 (pp. 1–11 relied on).

HENRY R. JILES, Primary Examiner

N. TROUSOF, Assistant Examiner

U.S. Cl. X.R.

260—79.3, 309.6, 465, 552, 553, 564; 424—253